(12) United States Patent
Kato

(10) Patent No.: US 11,108,233 B1
(45) Date of Patent: Aug. 31, 2021

(54) MANUFACTURING METHOD OF SOLAR HOUSE

(71) Applicant: KATO HOLDINGS CO., Ltd., Tokyo (JP)

(72) Inventor: Kenji Kato, Tokyo (JP)

(73) Assignee: KATO HOLDINGS CO., LTD., Tokyo (JP)

(*) Notice: Subject to any disclaimer, the term of this patent is extended or adjusted under 35 U.S.C. 154(b) by 0 days.

(21) Appl. No.: 16/972,682

(22) PCT Filed: Jun. 10, 2019

(86) PCT No.: PCT/JP2019/022872
§ 371 (c)(1),
(2) Date: Dec. 7, 2020

(87) PCT Pub. No.: WO2019/240060
PCT Pub. Date: Dec. 19, 2019

(30) Foreign Application Priority Data

Jun. 12, 2018 (JP) .............................. JP2018-111726
Jan. 30, 2019 (JP) .............................. JP2019-014576

(51) Int. Cl.
*H02S 20/00* (2014.01)
*H02J 3/00* (2006.01)

(52) U.S. Cl.
CPC .............. *H02J 3/004* (2020.01); *H02J 3/008* (2013.01); *H02J 2300/26* (2020.01)

(58) Field of Classification Search
CPC ...... H02J 2300/26; H02S 20/23; H02S 20/22; H02S 30/10
See application file for complete search history.

(56) References Cited

U.S. PATENT DOCUMENTS 8,716,642 B2 * 5/2014 Lin ........................ G05D 3/12
250/203.4
9,509,247 B1 11/2016 Hinson
(Continued)

FOREIGN PATENT DOCUMENTS

EP 2345322 7/2011
JP 11-234789 9/1999
(Continued)

OTHER PUBLICATIONS

International Search Report issued in PCT/JP2019/022872, dated Aug. 13, 2019, pp. 1-3,Translation pp. 1-2.
(Continued)

*Primary Examiner* — Mohammad Ali
*Assistant Examiner* — Vincent W Chang
(74) *Attorney, Agent, or Firm* — Jeffrey S. Melcher; Melcher Patent Law PLLC

(57) ABSTRACT

[Problem]
To provide a manufacturing method of a solar house capable of taking in a moderate amount of sunlight while obtaining a large amount of electric power generation.
[Solution]
A manufacturing method of a solar house 1 includes a step for contact-arranging the first house set 81, the second house set 82, and the intermediate house member 83 so that the intermediate house member 83 is positioned between the first house set 81 and the second house set 82 in the second direction Y; a step for contact-arranging the intermediate house member 83 and the other second house set 82 or the other first house set 81 in the second direction Y by a necessary number with respect to the arranged first house set 81 or the arranged second house set 82; and a step for supporting the first panel set 2 and the second panel set 3
(Continued)

with respect to the first house set 81 and the second house set 82 with the first support column 71.

2 Claims, 7 Drawing Sheets

(56) References Cited

U.S. PATENT DOCUMENTS

| | | | | |
|---|---|---|---|---|
| 2015/0311856 A1* | 10/2015 | Luo | ............... | F24S 25/13 52/173.3 |
| 2017/0202155 A1 | 7/2017 | Iwai | | |
| 2020/0329647 A1* | 10/2020 | Knoche | ............ | H02S 20/22 |

FOREIGN PATENT DOCUMENTS

| | | |
|---|---|---|
| JP | 2006-339522 | 12/2006 |
| JP | 3163760 | 10/2010 |
| JP | 3175085 | 4/2012 |
| JP | 3177129 | 7/2012 |
| JP | 2013-234462 | 11/2013 |
| JP | 2014-50369 | 3/2014 |
| JP | 2017-29120 | 2/2017 |
| JP | 2017-108582 | 6/2017 |
| JP | 6487590 | 3/2019 |
| KR | 10-2009-0110403 | 10/2009 |

OTHER PUBLICATIONS

Written Opinion issued in PCT/JP2019/022872, dated Aug. 13, 2019, pp. 1-4.
International Search Report issued in PCT/JP2019/017867, dated Jul. 16, 2019, pp. 1-3,Translation pp. 1-2.
Written Opinion issued in PCT/JP2019/017867, dated Jul. 16, 2019, pp. 1-3.

\* cited by examiner (a) (b) (c)

(a)

(b)

MANUFACTURING METHOD OF SOLAR HOUSE

TECHNICAL FIELD OF THE INVENTION

The present invention relates to a manufacturing method of a solar house using a solar panel.

BACKGROUND OF THE INVENTION

Conventionally, an agricultural house in which most of the roof and the south wall side are made by a transparent material (transparent glass), solar panels being installed on a part of the transparent material, is known. (for example, Patent Document 1).

PRIOR ART

Patent Document 1: Japanese Patent Application publication No. 2014-50369.

SUMMARY OF INVENTION

Problem to be Solved by the Invention

In the above-described technology, since the solar panels are simply arranged on a part of the roof, the amount of the electric power generation is proportional to the number of the solar panels.

In order to grow crops in an agricultural house, it is preferable to take in a moderate amount of sunlight evenly into the interior. However, with the above-described technology, direct sunlight enters only from the south wall side where the solar panels are not arranged. Therefore, it cannot be said that the environment is favorable for growing agricultural crops.

Further, if a large number of solar panels are laid out in the above-described technique in order to obtain a large amount of electric power generation, the cost of the solar panels is significantly increased, and also a moderate amount of sunlight cannot be taken in.

In view of the foregoing, it is an object of the invention to provide a manufacturing method of a solar house capable of taking in a moderate amount of sunlight while obtaining a large amount of electric power generation.

Means for Solving the Problem

A manufacturing method of a solar house includes: a first panel set having a plurality of first solar panels and capable of rotating around a first direction; a second panel set having a plurality of second solar panels and capable of rotating around the first direction, the first panel set and the second panel set being arranged in a second direction substantially orthogonal to the first direction; a driving mechanism for rotating the first panel set and the second panel set around the first direction to track sunlight; a house portion provided below the first panel set and the second panel set; and a plurality of first support columns erected for supporting the first panel set and the second panel set. The house portion is provided with a first house set disposed below the first panel set, a second house set disposed below the second panel set and an intermediate house member disposed between the first house set and the second house set, at least an upper portion of the intermediate house member being formed of a transparent member. Each of the first panel set and the first house set has a connecting portion, one first support column being connected to the connecting portions of the first panel set and the first house set to support the first panel set and the first house set, each of the second panel set and the second house set having a connecting portion, another first support column being connected to the connecting portions of the second panel set and the second house set to support the second panel set and the second house set. Sizes of the first panel set and the second panel set in the second direction, sizes of the first house set, the second house set, and the intermediate house member in the second direction, and supporting positions of the first panel set and the second panel set with respect to the first house set and the second house set by the first support column are set so that the first panel set does not block reception of sunlight by the second panel set and the second panel set does not block reception of sunlight by the first panel set, even when the first panel set and the second panel set are tilted to a maximum to track sunlight. The first panel set does not block the reception of sunlight by the second panel set and the second panel set does not block the reception of sunlight by the first panel set by disposing the intermediate house member between the first house set and the second house set adjacent to each other in the second direction, even when a plurality of first house sets and a plurality of second house sets are alternately arranged in the second direction to increase or decrease number of arrangement. The manufacturing method includes: a step for preparing one or more first house sets having a predetermined size, one or more first panel sets having a predetermined size, one or more second house sets having a predetermined size, one or more second panel sets having a predetermined size, and the plurality of first support columns having a predetermined size; a step for preparing one or more intermediate house members having a predetermined size; a step for contact-arranging the first house set, the second house set, and the intermediate house member so that the intermediate house member is positioned between the first house set and the second house set in the second direction; a step for contact-arranging the intermediate house member and the other second house set or the other first house set in the second direction by a necessary number with respect to the arranged first house set or the arranged second house set; and a step for supporting the first panel set and the second panel set with respect to the first house set and the second house set with the first support column.

With this configuration, only by contact-arranging the first house set, the intermediate house member, and the second house set, it becomes possible to easily manufacture the solar house in which the first panel set and the second panel set do not block each other from receiving sunlight even when the first panel set and the second panel set are tilted to the maximum by tracking sunlight. In addition, since the first house set, the intermediate house member, and the second house set can be connected to each other by a necessary number, the solar house, which does not block the reception of sunlight, can be easily expanded.

It is preferable that the sizes of the first panel set and the second panel set in the second direction, the sizes of the first house set, the second house set, and the intermediate house member in the second direction, and the supporting positions of the first panel set and the second panel set by the first support column are set so that the first panel set blocks the reception of sunlight by the second panel set or the second panel set blocks the reception of sunlight by the first panel set, if the first panel set and the second panel set are tilted more than the maximum to track sunlight.

With this configuration, the space between the first panel set and the second panel set can be minimized to the extent that the maximum efficiency of the tracking type can be obtained, so that a large number of panel sets can be arranged in a predetermined construction area to obtain a large amount of electric power.

Effects of the Invention

According to the manufacturing method of the solar house of the present invention, it becomes possible to easily manufacture the solar house capable of taking in a moderate amount of sunlight, while obtaining a large amount of electric power generation.

PREFERRED EMBODIMENTS

A solar house 1 according to a preferred embodiment of the present invention will be described below, while referring to FIGS. 1 to 11.

Figure 1:
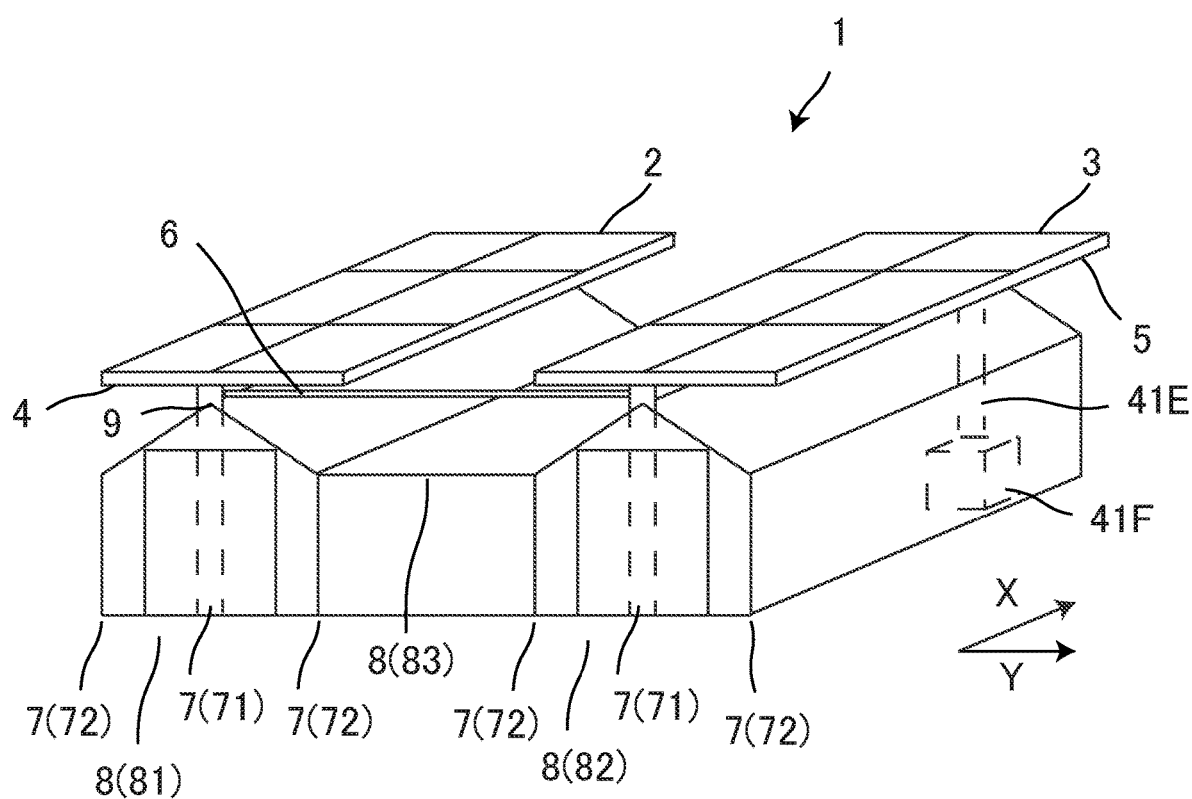
FIG. 1 is a general view of a solar house according to an embodiment of the present invention.

As shown in FIG. 1, the solar house 1 includes a first panel set 2, a second panel set 3, a first mount 4, a second mount 5, a driving mechanism 6, a plurality of support columns 7, and a house portion 8.

Figure 2:
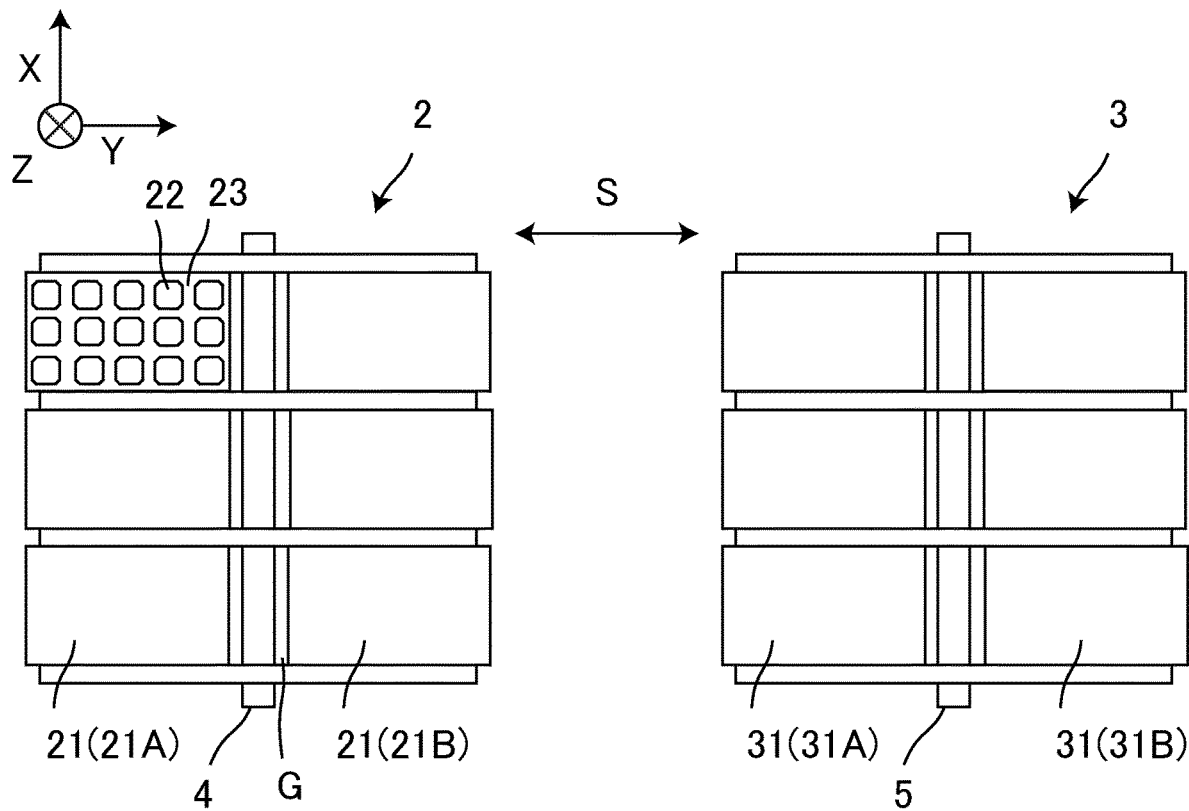
FIG. 2 is a plan view of a first panel set according to the embodiment of the present invention.

As shown in FIG. 2, the first panel set 2 includes a plurality of first solar panels 21 and is supported by the first mount 4. Similarly, the second panel set 3 includes a plurality of second solar panels 31 and is supported by the second mount 5.

In the present embodiment, since a set of the first panel set 2 and the first mount 4 has the same configuration as a set of the second panel set 3 and the second mount 5, the set of the first panel set 2 and the first mount 4 will be described below, and the description of the set of the second panel set 3 and the second mount 5 will be omitted.

As shown in FIG. 2, the plurality of first solar panels 21 is provided with a plurality of first-row solar panels 21A arranged in a first direction X and a plurality of second-row solar panels 21B arranged in the first direction X. The plurality of first-row solar panels 21A and the plurality of second-row solar panels 21B are arranged side by side in a second direction Y substantially orthogonal to the first direction X. In the present embodiment, the first direction X substantially coincides with the north-south direction, while the second direction substantially coincides with the east-west direction.

In the present embodiment, the plurality of first solar panels 21 is a transmissive and bifacial type. More specifically, as shown in FIG. 2, the first solar panel 21 has a substantially rectangular shape, and a plurality of double-sided light receiving cells 22 are regularly arranged in the first solar panel 21. A transmitting member 23 such as glass and the like is disposed between each double-sided light receiving cell 22.

With this configuration, sunlight is received by the surface of the double-sided light receiving cell 22 and is transmitted through the transmitting member 23. The sunlight transmitted through the transmitting member 23 and reflected by the ground or the like is received by the back surface of the double-sided light receiving cell 22. Due to the transmissive characteristic, sunlight is projected onto the ground in the state of tree leakage to supply a moderate amount of sunlight to crops and the like. On the other hand, due to the bifacial characteristic, it is possible to generate electric power, even with light reflected from the ground. In the present embodiment, the thicknesses of the double-sided light receiving cell 22 and the transmitting member 23 extend in a third direction Z substantially orthogonal to both the first direction X and the second direction Y.

Figure 3:
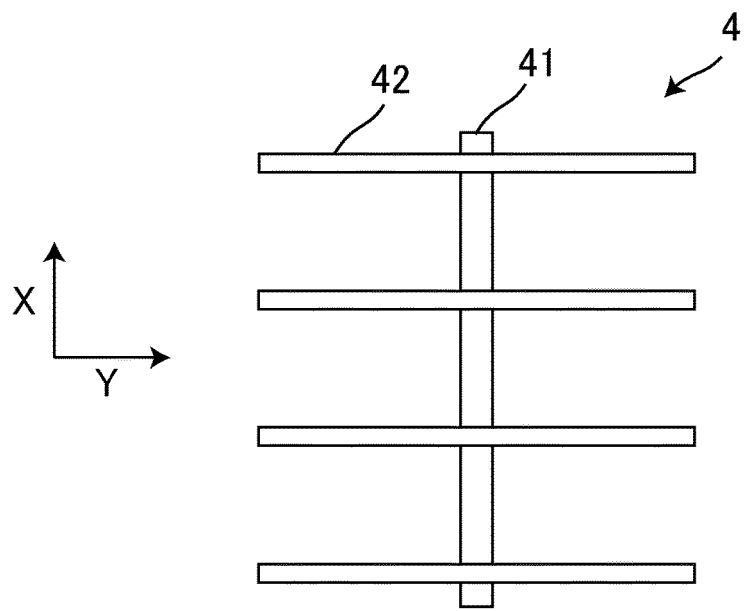
FIG. 3 is a plan view of a first mount according to the embodiment of the present invention.
Figure 4:
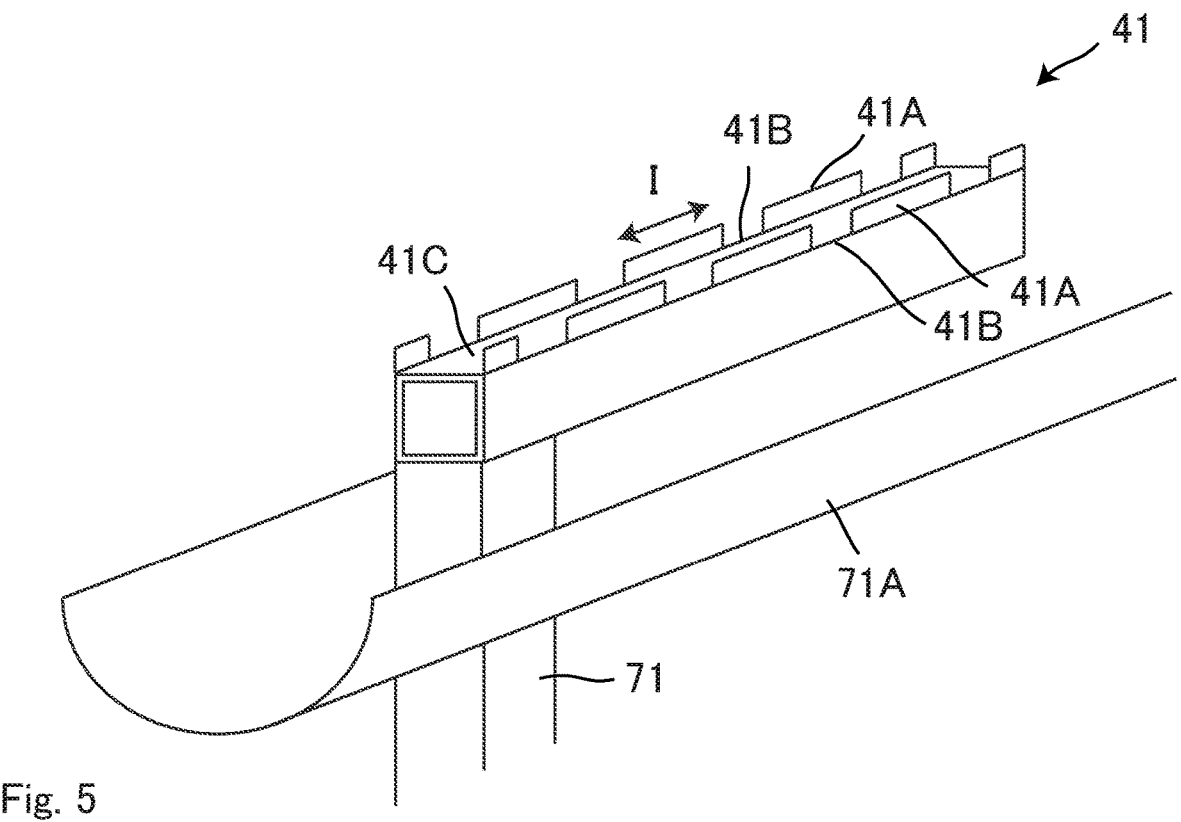
FIG. 4 is a perspective view of a main shaft according to the embodiment of the present invention.
Figure 5:
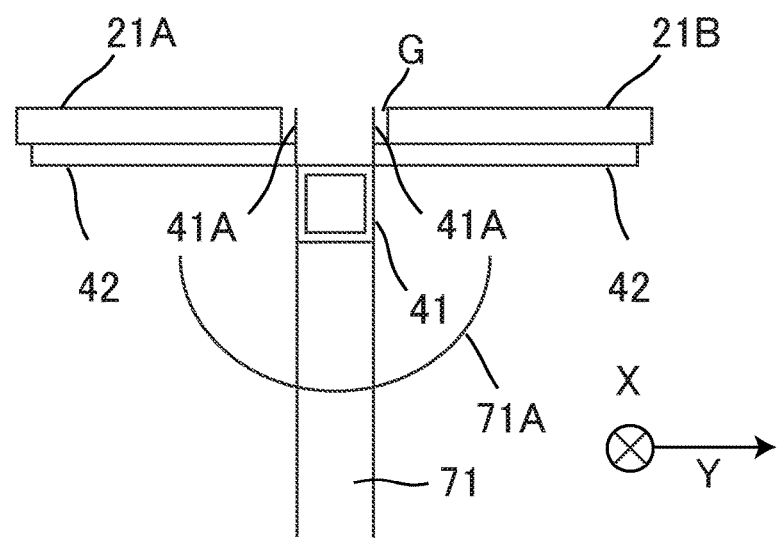
FIG. 5 is a side cross-sectional view of the first panel set and the first mount according to the embodiment of the present invention.

As shown in FIGS. 3 to 5, the first mount 4, for supporting the first panel set 2 put thereon, is provided with a main shaft 41 and a plurality of partition portions 42.

As shown in FIG. 4, when the main shaft 41 is arranged so as to extend in the first direction X, a pair of upright portions 41A is respectively erected from both end portions in a direction intersecting the first direction X (in the present embodiment, the second direction Y). A plurality of fitting portions 41B in which a plurality of partition portions 42 is respectively fitted is formed at predetermined intervals I in each upright portion 41A. The predetermined interval I is set to a length (substantially the same or slightly shorter) corresponding to the length of the first solar panels 21 (the first-row solar panels 21A and the second-row solar panels 21B) in the first direction X.

The plurality of partition portions 42 is fitted to the plurality of fitting portions 41B respectively to partition the plurality of first-row solar panels 21A and the plurality of second-row solar panels 21B. As shown in FIG. 3, the partition portions 42 extend to both sides of the main shaft 41 so as to intersect the main shaft 41 (orthogonally in the present embodiment).

Under such configuration, as shown in FIG. 2, the plurality of first-row solar panels 21A and the plurality of second-row solar panels 21B are put on the first mount 4 with the main shaft 41 as a boundary, in a state where the main shaft 41 extends in the first direction X and the plurality of partition portions 42 extends in the substantially second direction.

At this time, since the predetermined interval I between each fitting portion 41B is set to the length corresponding to the length of the first solar panels 21 (the first-row solar panels 21A and the second-row solar panels 21B) in the first direction X, the plurality of first-row solar panels 21A and the plurality of second-row solar panels 21B are respectively partitioned by the plurality of partition portions 42.

When the predetermined interval I is substantially equal to the length of the first solar panel 21 in the first direction X, the first solar panel 21 is preferably supported by another member in order to prevent the first solar panel 21 from falling off the first mount 4 (between the partition portions 42 adjacent each other in the first direction X).

As described above, in the present embodiment, since the partition portion 42 is fitted onto the fitting portion 41B formed at intervals corresponding to the length of the first solar panel 21 in the first direction X, the positioning of the partition portion 42 becomes accurate and easy.

Further, since the position of the first solar panel in the first direction X is defined by the partition portions 42, it is possible to arrange each first solar panel at an accurate position, and at the same time, it is possible to prevent each first solar panel 21 from moving in the first direction X.

The first solar panel 21 is preferably fixed to the first mount 4 by a stopper or the like so that the first solar panel 21 does not move in the second direction Y.

Further, as will be described later, as shown in FIGS. 2 and 5, the first-row solar panel 21 A and the second-row solar panel 21B are arranged with a predetermined gap G from the main shaft 41.

Figure 6:
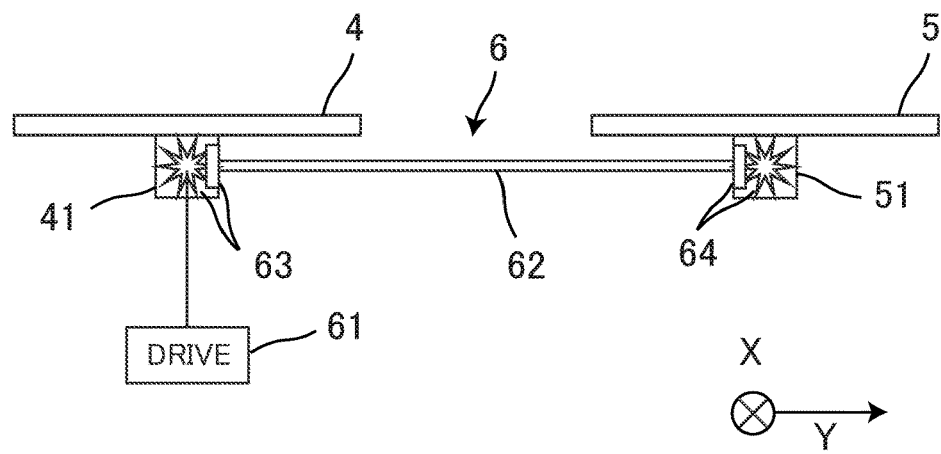
FIG. 6 is an explanatory view of a driving mechanism according to the embodiment of the present invention.

As shown in FIG. 6, the driving mechanism 6 includes a driving unit 61, a transmitting unit 62, a first converting unit 63, and a second converting unit 64.

The driving unit 61 rotates the first mount 4 (main shaft 41) around the first direction X.

The transmitting unit 62 extends in the second direction Y and is disposed between the main shaft 41 of the first mount 4 and the main shaft 51 of the second mount 5.

The first converting unit 63 is connected between the main shaft 41 of the first mount 4 and the transmitting unit 62 to convert the rotation of the main shaft 41 around the first direction X to a rotation of the transmitting unit 62 around the second direction Y.

In the present embodiment, as shown in FIG. 6, the first converting unit 63 includes a gear which is mounted on the main shaft 41 to rotate around the first direction X, and a gear which is mounted on the main shaft 41 side of the transmitting unit 62 to rotate around the second direction Y. Therein, the rotation around the first direction X is converted into the rotation around the second direction Y by the two gears engaged with each other.

The second converting unit 64 is connected between the transmitting unit 62 and the main shaft 51 of the second mount 5 to convert the rotation of the transmitting unit 62 around the second direction Y to a rotation of the main shaft 51 around the first direction X.

In the present embodiment, as shown in FIG. 6, the second converting unit 64 includes a gear which is mounted on the main shaft 51 side of the transmitting unit 62 to rotate around the second direction Y and a gear which is mounted on the main shaft 51 and rotates around the first direction X. Therein, the rotation around the second direction Y is converted into the rotation around the first direction X by the two gears engaged with each other. As the result, the first panel set 2 (the second panel set 3) rotates around the main shaft 41 (the first direction X).

With such configuration, a plurality of mounts (the first mount 4 and the second mount 5 in the present embodiment) can be rotated by one driving unit 61. Therefore, even when a large number of house sets (which will be described later) and a large number of panel sets are provided to obtain a large working space, a plurality of mounts can be rotated by one driving unit 61. Therefore, the cost and space for installing the driving unit 61 can be significantly reduced.

Figure 7:
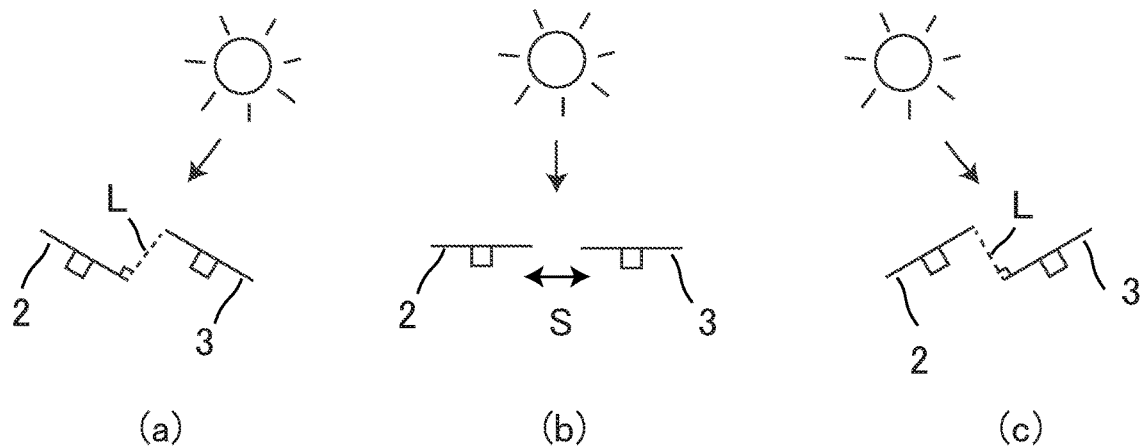
FIG. 7 is an explanatory view of a solar light tracking by the driving mechanism according to the embodiment of the present invention.

Under such configuration, as shown in FIG. 7, the driving unit 61 drives the first mount 4 and the second mount 5 so that the first panel set 2 mounted on the first mount 4 and the second panel set 3 mounted on the second mount 5 track sunlight, that is, the surfaces of the first panel set 2 and the second panel set 3 continue to face the sun. (a) of FIG. 7 shows the case where the sun is in the east side, (b) of FIG. 7 shows the case where the sun is near the top, and (c) of FIG. 7 shows the case where the sun is in the west side.

As shown in FIG. 1, the plurality of support columns 7 is steel columns or the like erected from the ground to support the first panel set 2 and the second panel set 3, respectively. The plurality of support columns 7 includes a plurality of first support columns 71 and a plurality of second support column 72.

In the present embodiment, the plurality of first support columns 71 rotatably supports the main shaft 41 of the first mount 4 and the main shaft 51 of the second mount 5 near the both end portions of the main shaft 41 and the main shaft 51 in the first direction X. The plurality of second support columns 72 supports the house portion 8. The support of the house portion 8 by the plurality of second support columns 7 will be described later.

As shown in FIG. 1, the house portion 8 includes a first house set 81, a second house set 82, and an intermediate house member 83, each of them being made of a transparent material capable of holding own shape.

In the present embodiment, the first house set 81 is disposed below the first panel set 2; the second house set is disposed below the second panel set 3; and the intermediate house member 83 is disposed below the space S.

Figure 8:
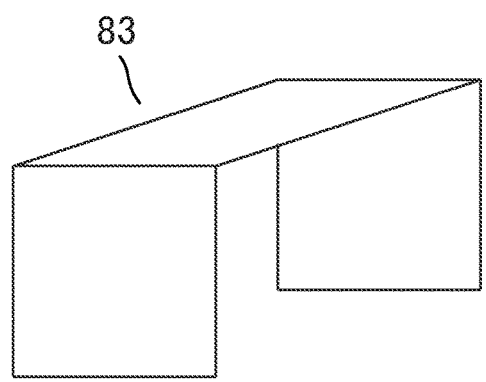
FIG. 8 is a perspective view of an intermediate house member according to the embodiment of the present invention.

The first house set 81 and the second house set 82 have the same size and have the same shape in which the upper part is inclined in a mountain shape in order to correspond to the rotation of the first panel set 2 and the second panel set 3. On the other hand, as shown in FIG. 8, the sides of the intermediate house member 83 adjacent to the first house set 81 and the second house set 82 are opened, and the upper surface thereof has a substantially flat plate shape. This configuration makes substantially U shape.

The first house set 81 is supported together with the first panel set 2 (the first frame 4) by the first support column 71, as shown in FIGS. 1 and 5. In this embodiment, the first panel set 2 and the first house set 81 are supported together at substantially central portions in the second direction Y. Further, the first house set 81 is supported by the second support column 72 at the both end portions in the second direction Y.

The second house set 82 is supported together with the second panel set 3 (the second frame 5) by the first support column 71, as shown in FIGS. 1 and 5. In this embodiment, the second panel set 3 and the second house set 82 are supported together at substantially central portions in the second direction Y. Further, the second house set 82 is supported by the second support column 72 at the both end portions in the second direction Y.

The intermediate house member 83 is supported by the second support columns 72 adjacent to the space S among the second support columns 72 together with the first panel set 2 and the second panel set 3.

Of the side surfaces of the first house set 81 and the second house set 82, at least the side surface adjacent to the intermediate house member 83 is opened. As the result, it is possible to effectively use the space below the space S in which a vinyl house or the like is normally not installed. Therefore, a large working space is secured below the first panel set 2, the second panel set 3, and the space S due to the connected house portion 8.

According to the above-described configuration, most of the upper portion of the house portion 8 is covered with the first panel set 2 and the second panel set 3. However, sunlight can enter in the interior of the house portion 8 from the space S.

On the other hand, it is preferable to take in the sunlight transmitted through the double-sided light receiving cell 22 into the interior of the house portion 8. However, in the configuration where the first panel set 2 and the second panel set 3 do not track sunlight, sunlight obliquely incident on the transmitting member 23 is reflected on the side surface of the double-sided light receiving cell 22 as shown in (a) of FIG. 9. Therefore, the amount of sunlight entering the interior of the house portion 8 is reduced.

Figure 9:
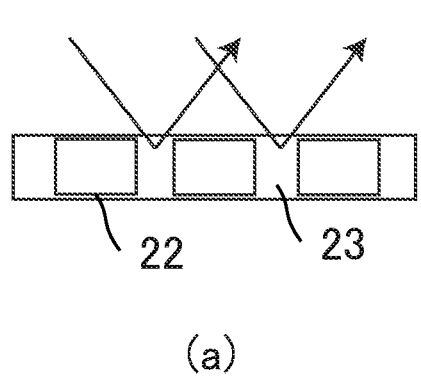
FIG. 9 is a side cross-sectional view of a first solar panel according to the embodiment of the present invention.
Figure 9:
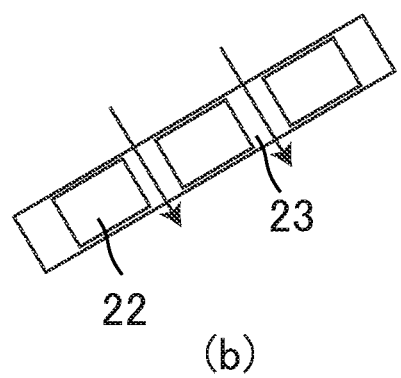

However, in the present embodiment, since the first panel set 2 and the second panel set 3 are configured to track the sunlight, the sunlight is incident substantially orthogonal to the transmitting member 23, as shown in (b) of FIG. 9, and a large amount of sunlight can be taken into the house portion 8.

As described above, in the solar house 1 according to the present embodiment, since it is possible to take in a moderate amount of sunlight into the interior of the house portion 8 while suppressing the polarization of amount of sunlight, it is possible to grow crops and the like inside the house portion 8 in a favorable environment. On the other hand, since most of the upper portion of the house portion 8 is covered with the first panel set 2 and the second panel set 3, the first panel set 2 and the second panel set 3 suppress the incidence of direct sunlight into the house portion 8 in summer, while the first panel set 2 and the second panel set 3 function as a heat insulating material in winter. Therefore, the house portion 8 has an environment-friendly heat pump function. If a production facility of plants or the like is provided inside the house portion 8, plants or the like can be automatically cultivated using the electric power obtained by the first panel set 2 and the second panel set 3, and plants and the like can be cultivated in an environmentally friendly manner without the need of electric power from the outside.

For example, if a plant LED lighting light guide plate is provided, the production of seasonal vegetables can be adjusted. Further, a moisture meter is provided on the ground, and when moisture is insufficient, rain water or the like stored in the tank 41F can be automatically sprayed. Examples of automated work included in such production facilities include water sprinkling, air conditioning, lighting, and fertilizing (scattering fertilizer) and the like.

Figure 10:
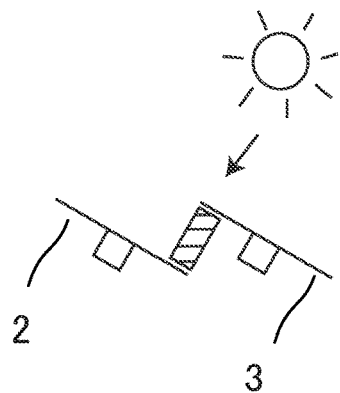
FIG. 10 is an explanatory view of a positional relation between the first panel set and a second panel set according to the embodiment of the present invention.

As shown in FIG. 10, if the first panel set 2 and the second panel set 3 approach excessively with each other, one panel set becomes a shadow (hatched portion) of the other panel set when tracking the sun, and the electric power generation efficiency is lowered.

Therefore, in the present embodiment, in order to obtain electric power at maximum efficiency, the first panel set 2 and the second panel set 3 are arranged with a space S is opened therebetween, when the first panel set 2 and the second panel set 3 are placed on a straight line as shown in (b) of FIG. 7.

The space S is set to such distance that the first panel set 2 does not block the reception of sunlight by the second panel set 3 and the second panel set 3 does not block the reception of sunlight by the first panel set 2 even when the first panel set 2 and the second panel set 3 are tilted to a maximum for tracking sunlight. In particular, in the present embodiment, the sizes of the first panel set 2 and the second panel set 3 in the second direction Y, the sizes of the first house set 81, the second house set 82, and the intermediate house member 83 in the second direction Y, and the supporting positions of the first panel set 2 and the second panel set 3 with respect to the first house set 81 and the second house set 82 by the first support column 71 are set so that the first panel set 2 blocks the reception of sunlight by the second panel set 3 or the second panel set 3 blocks the reception of sunlight by the first panel set 2, if the first panel set 2 and the second panel set 3 are tilted more than the maximum to track sunlight. In other words, when the first panel set 2 and the second panel set 3 are tilted to substantially the maximum, as shown in FIGS. 7a and 7c, the first panel set 2 and the second panel set 3 are substantially orthogonal to a virtual straight line L (FIG. 7) connecting the end of the first panel set 2 closer to the second panel set 3 and the end of the second panel set 3 closer to the first panel set 2.

Thus, by contact-arranging the first house set 81, the second house set 82, and the intermediate house member 83 in the second direction Y, it becomes possible to easily manufacture the solar house 1 in which the first panel set 2 and the second panel set 3 do not block each other from receiving sunlight even when the first panel set 2 and the second panel set 3 are tilted to the maximum by tracking sunlight.

Here, in the present embodiment, each of the first panel set 2 (the second panel set 3) and the first house set (the first house set 82) is provided with a connecting portion 9 to be connected to the first support column 71. As the configuration of the connecting portion 9, various configurations such as providing a concave portion on the side of the first panel set 2 (the second panel set 3) and a convex portion on the side of the first support column 71 can be considered (FIG. 1 shows a state in which the connecting portions 9 are connected respectively). As the result, the first panel set 2 (the second panel set 3) is necessarily supported at the set position with respect to the first house set 81 (the second house set 82), and then the first panel set 2 and the first house set 81 (the second panel set 3 and the second house set 82) are unitized. Therefore, only by contact-arranging the first house set 81, the second house set 82, and the intermediate house member 83, it becomes possible to easily manufacture a solar house in which the first panel set 2 and the second panel set 3 do not block each other from receiving sunlight even when the first panel set 2 and the second panel set 3 are tilted to the maximum by tracking sunlight.

In the present embodiment, not only those three (i.e. the first house set 81, the second house set 82, and the intermediate house member 83), but also more house sets and intermediate house members can be connected in the second direction Y. Therefore, the solar house 1 can be expanded by increasing or decreasing the number of these connections. Even in this case, by arranging the intermediate house members between the house sets, the panel sets do not block each other from receiving the sunlight even when the panel sets are tilted to the maximum by tracking sunlight. Further, even in this case, if the transmitting unit 62 is commonly used for a plurality of mounts, the plurality of mounts can be rotated by one driving unit 61.

In order to suppress the manufacturing cost of the solar house 1, a method in which members (panel sets, house sets, and the like) of a predetermined size are manufactured in advance, and then the members are combined at the field can be considered. However, since the size of the solar house 1 desired by clients varies, it is also conceivable that only members having a prescribed size cannot meet the request of the clients. On the other hands, in the solar house 1 of the present invention, since the first house set 81, the second house set 82, and the intermediate house member 83 are connectable, it is possible to meet the request of the clients by increasing or decreasing the number of connections.

Further, since the intermediate house member 83 requires the least the exterior or interior, it is easy to prepare or order-produce various sizes of the intermediate house member 83 in advance. Therefore, it becomes possible to meet more detailed requirements. Here, if the space S between the first panel set 2 and the second panel set 3 is made wide, it may not make the positional relationship of the panel sets in which each panel set blocks the other's reception of sunlight, even if the panel set is tilted more than the maximum by tracking sunlight. Accordingly, there is a possibility that the number of the panel sets that can be arranged may be reduced. However, as long as the condition "does not block each other's reception of sunlight" is maintained, more detailed demand for the size of the solar house 1 is met while obtaining the maximum efficiency by the tracking type.

Figure 11:
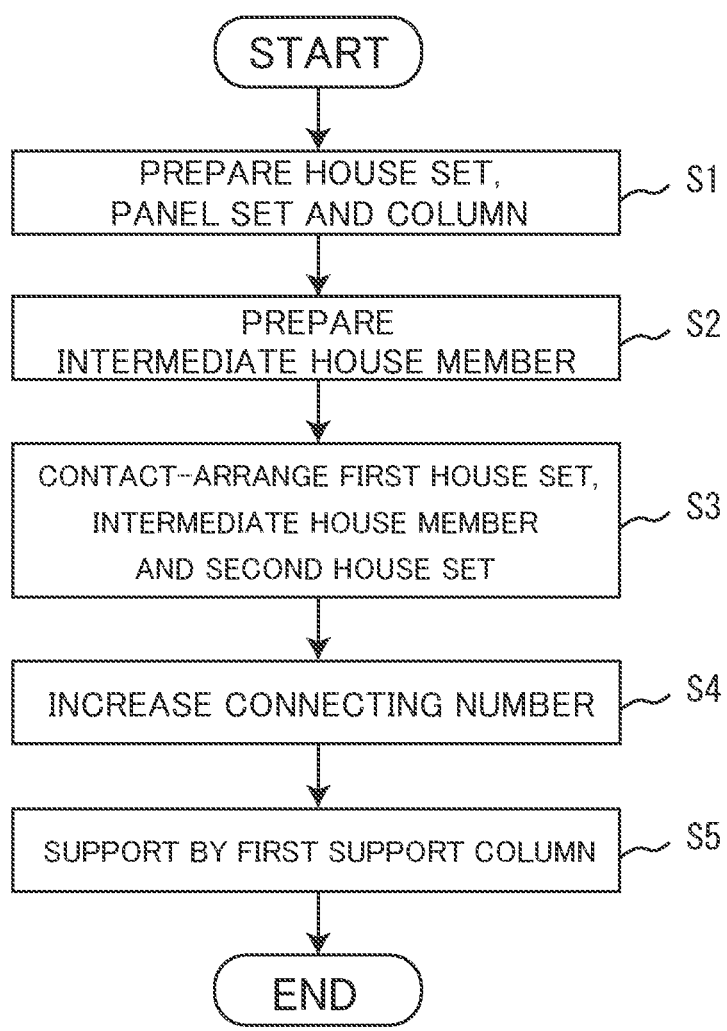
FIG. 11 is a flowchart of the manufacturing method of the solar house according to the embodiment of the present invention.

A manufacturing method of the solar house 1 will be described with reference to the flowchart of FIG. 11.

First, one or more first house sets 81 having a predetermined size, one or more first panel sets 2 having a predetermined size, one or more second house sets 82 having a predetermined size, one or more second panel sets 3 having a predetermined size, and a plurality of first support columns 71 having a predetermined size are prepared (S1).

Next, one or more intermediate house members 83 having a predetermined size are prepared (S2). The order of the steps S1 and the step S2 may be reversed.

Subsequently, the first house set 81, the second house set 82, and the intermediate house member 83 are contact-arranged so that the intermediate house member 83 is positioned between the first house set 81 and the second house set 82 in the second direction Y (S3).

Next, an intermediate house member 83 and the other second house set 82 or the other first house set 81 are contact-arranged in the second direction Y by a necessary number with respect to the arranged first house set 81 or the arranged second house set 82 (S4).

Finally, the first panel set 2 and the second panel set 3 are supported with respect to the first house set 81 and the second house set 82 respectively with the first support column 71 (S5). In the present embodiment, the step S5 is performed by connecting the connecting portions 9 which are provided in the respective panel set and house set. The step of S5 may be performed before the step of S3 or S4.

As the result, even when the number of connection is increased or decreased, it is possible to easily manufacture the solar house 1 that will not block the reception of sunlight.

Returning to FIGS. 4 and 5, in the present embodiment, the first support column 71 is provided with a concaved gutter 71A. The concaved gutter 71A extends in the first direction X to receive and carry liquid falling from the predetermined gap G between the main shaft 41 and the first-row solar panels 21A (the second-row solar panels 21B).

With this configuration, liquid such as rain water falling from the predetermined gap G is received and carried by the concave gutter 71A. As the result, it is possible to prevent rain water or the like flowing onto the main shaft 41 from being concentrated on only a part of the ground and falling down, thereby forming an unintentional water reservoir at an unintended position.

As shown in FIG. 1, the concaved gutter 71A is preferably connected to a drain pipe 41E, and the discharged rainwater or the like is preferably stored in a tank 41F provided inside or outside of the house portion 8 (the concaved gutter 71A is omitted in FIG. 1).

As described above, in the manufacturing method of the solar house 1 according to the present embodiment, the sizes of the first panel set 2 and the second panel set 3 in the second direction Y, the sizes of the first house set 81, the second house set 82, and the intermediate house member 83 in the second direction Y, and the supporting positions of the first panel set 2 and the second panel set 3 with respect to the first house set 81 and the second house set 82 by the first support column 71 are set so that the first panel set 2 does not block the reception of sunlight by the second panel set 3 and the second panel set 3 does not block the reception of sunlight by the first panel set 2, even when the first panel set 2 and the second panel set 3 are tilted to the maximum to track sunlight. The first house set 81, the intermediate house member 83, and the second house set 82 can be contact-arranged in the second direction Y by a necessary number.

With this configuration, only by contact-arranging the first house set 81, the intermediate house member 83, and the second house set 82, it becomes possible to easily manufacture the solar house 1 in which the first panel set 2 and the second panel set 3 do not block each other from receiving sunlight even when the first panel set 2 and the second panel set 3 are tilted to the maximum by tracking sunlight. In addition, since the first house set 81, the intermediate house member 83, and the second house set 82 can be connected to each other by a necessary number, the solar house 1, which does not block the reception of sunlight, can be easily expanded.

Further, in the solar house 1 according to the present embodiment, the sizes of the first panel set 2 and the second panel set 3 in the second direction Y, the sizes of the first house set 81, the second house set 82, and the intermediate house member 83 in the second direction Y, and the supporting positions of the first panel set 2 and the second panel set 3 with respect to the first house set 81 and the second house set 82 by the first support column 71 are set so that the first panel set 2 blocks the reception of sunlight by the second panel set 3 or the second panel set 3 blocks the reception of sunlight by the first panel set 2, if the first panel set 2 and the second panel set 3 are tilted more than the maximum to track sunlight.

With this configuration, the space S between the first panel set 2 and the second panel set 3 can be minimized to the extent that the maximum efficiency of the tracking type can be obtained, so that a large number of panel sets can be arranged in a predetermined construction area to obtain a large amount of electric power.

While the solar house and the manufacturing method of the solar house of the invention have been described in detail with reference to the preferred embodiment thereof, it would be apparent to those skilled in the art that many modifications and variations may be made therein without departing from the spirit of the invention, the scope of which is defined by the attached claims.

(1) Structure of Mount

For example, in the above-described embodiment, since the first mount 4 is rotated around the main shaft 41, rain water that has fallen onto the first solar panel 21 also can move and fall in accordance with the rotation of the solar panel 21. This also may cause the rain water to concentrate to fall on a part of the ground.

Figure 12:
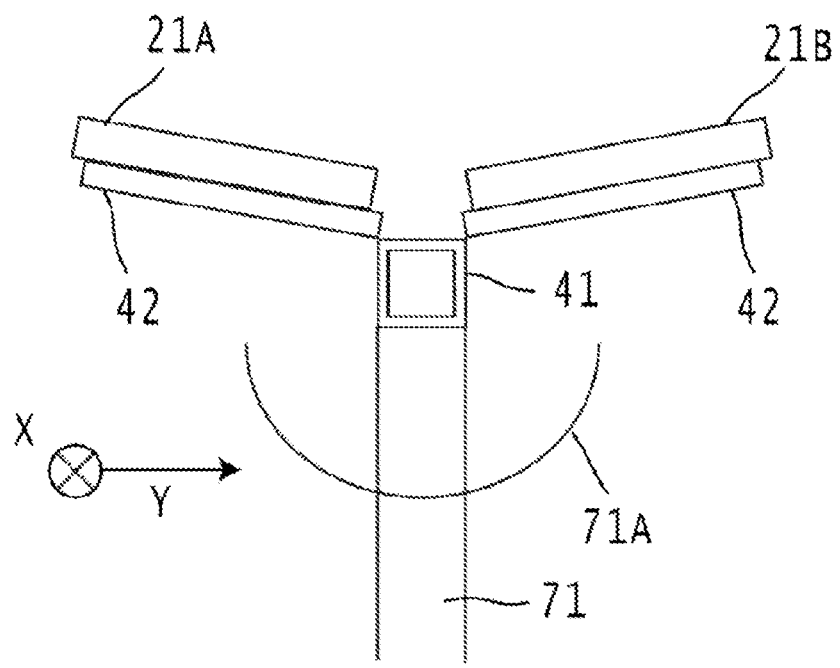
FIG. 12 is a side cross-sectional view of a first panel set and a first mount according to a modification of the present invention.

Now, as shown in FIG. 12, each partition portion 42 (first mount 4) may have a V shape whose center is located on the main shaft 41.

With this configuration, since rain water that has fallen onto the first solar panel 21 moves to the main shaft (gap G), rain water and the like is prevented from being concentrated to fall in an unintended place. In addition, since light is reflected and scattered near the center of the V shape, further power generation can be performed by the scattered light.

Further, an anemometer may be provided to control the driving unit 61 to stop the first panel set 2 and the second panel set 3 in a horizontal state when the wind is strong. In the case where the partition portion 42 has a V shape as described above, it is preferable that the central portion of the V shape of the partition portion 42 is made to have a rotatable structure and the partition portion 42 is made horizontal to stop the tracking of sunlight.

The gap G is not necessarily provided in the horizontal direction, and for example, the gap G may be provided in the vertical direction, as long as rainwater can pass therethrough.

(2) Connection in the First Direction X

In addition, a configuration in which a plurality of first panel sets 2 is connected in the first direction X can also be considered. In this case, it is possible to carry rain water or the like in the distance by connecting adjacent main shafts 41. For example, when a pond or the like exists outside the site of the solar house 1, it is possible to drain water directly into the pond or the like, and it is unnecessary to provide the tank 41F. Also in this case, by connecting the adjacent main shafts 41, the plurality of first mounts (the first panel sets 2) connected in the first direction X can be rotated by one driving unit 61.

When a plurality of first panel sets 2 is connected in the first direction X, it is preferable that the concaved gutter 71A extends in the first direction X and is connected to the other first support column 71 supporting the other first panel set 2 arranged in the first direction X. Thus, it is possible to prevent rain water or the like from falling to an unintended position, such as between the first panel sets 2.

When a plurality of first panel sets 2 is connected in the first direction X, the concaved gutter 71A may not be necessarily connected to the other first support column 71. For example, if rain water is used for greenhouse cultivation, a drain pipe and a tank may be provided in the vicinity of each of the first support columns 71, and rain water may be stored in the tank from the concaved gutter 71A through the drain pipe. In the above embodiment, the concaved gutter 71A has a semi-circular cross section as shown in FIGS. 4 and 5, but the concave shape is not limited to this.

(3) Structure of the House Section

In the above-described embodiment, both of the first panel set 2 (the second panel set 3) and the first house set (the second house set 82) are supported by the first support column 71 at substantially the center portion in the second direction Y. However, the support position is not limited to the "substantially the center portion in the second direction Y", as long as the first panel set and the second panel set do not block each other from receiving sunlight even when the first panel set and the second panel set are tilted to the maximum by tracking sunlight, considering the relationship among the size of the panel set, the size of the house set (and the intermediate house member), and the support position.

In the above embodiment, the first house set 81 (the second house set 82) is supported together with the first panel set 2 (the second panel set 3) by the first support column 71. However, the first house set 81 (the second house set 82) may be supported separately from the first panel set (the second panel set 3) by other support columns as long as the support position of the first panel set 2 (the second panel set 3) with respect to the first house set 81 (the second house set 82) by the first support column 71 is set. However, when the first house set 81 (the second house set 82) is supported together with the first panel set 2 (the second panel set 3) by the first support column 71, the structure can be simplified, and more materials and space can be saved.

In the above embodiment, the intermediate house member 83 has a substantially U shape, but may have other shapes.

In the above-described embodiment, the side surfaces of the first house set 81, the second house set 82, and the intermediate house member 83 adjacent to each other are opened. However, the side surfaces may be openable depend on the necessity. This case is also included in "opened" of the present invention.

Further, in the above-described embodiment, the first house set 81, the second house set 82, and the intermediate house member 83 are made of a transparent material, but it is sufficient that at least the upper portion is made of a transparent material. Even in this case, a moderate amount of sunlight can be taken into the interior of the house portion 8 by the space S and the transmitting member 23 of the first solar panel 21 while suppressing the polarization of amount of sunlight.

In the above-described embodiment, the first support columns 71 support the end portions of the first house set 81 and the second house set 82 in the first direction X. However, for example, if the first house set 81 and the second house set 82 are extended in the first direction X and the positions inside the end portions are supported by the first support columns 71, the first support column 71 does not hinder the entry and exit of the first house set 81 and the second house set 82 into the interior.

Further, for example, when the height is required for the work in the house portion 8, it is a matter of course that the support column 7 and the house portion 8 having a height corresponding to the requirement may be employed.

(4) A Manufacturing Method of a Solar House

In the above embodiment, the first house set 81, the second house set 82, and the intermediate house member 83 are contact-arranged so that the intermediate house member is positioned between the first house set 81 and the second house set 82 in the second direction Y, and then the first panel set 2 and the second panel set 3 are supported by the first support column 71 with respect to the first house set 81 and the second house set 82. However, the first panel set 2 (the second panel set 3) may be supported first with respect to the first house set 81 (the second house set 82) by the first support column 71, or otherwise the first panel set 2 (the second panel set 3) may be supported in the middle of the contact-arrangement.

(5) Methods of Using Solar Houses

The solar house of the present invention is not limited to use for vegetation, and the interior of the house portion 8 can be used as a parking lot, a house, a temporary housing, a warehouse, or a combination thereof.

In addition, it is considered that the ground corresponding to the space S is likely to be warm because the sunlight easily enters the ground. Therefore, it is considerable to provide in this portion a pipe for distributing underground heat within the house portion 8.

DESCRIPTION OF THE REFERENCE NUMBER

1 Solar house
2 First panel set

3 Second panel set
4 First mount
5 Second mount
6 Driving mechanism
7 Support column
8 House portion
9 Connecting portion
21 First solar panel
21A First-row solar panel
21B Second-row solar panel
22 Double-sided light receiving cell
23 Transmitting member
31 Second solar panel
41 Main shaft
41A Upright portion
41B Fitting portion
41E Drain pipe
41F Tank
42 Partition portion
42A Convex portion
51 Main shaft
61 Driving unit
62 Transmitting unit
63 First converting unit
64 Second converting unit
71 First support column
71A Concaved gutter
72 Second support column
81 First house set
82 Second house set
83 Intermediate house member
S Space
X First direction
Y Second direction
Z Third direction

The invention claimed is:

1. A manufacturing method of a solar house including:
a first panel set having a plurality of first solar panels and capable of rotating around a first direction; a second panel set having a plurality of second solar panels and capable of rotating around the first direction, the first panel set and the second panel set being arranged in a second direction orthogonal to the first direction; rotating the first panel set and the second panel set around the first direction to track sunlight; a house portion provided below the first panel set and the second panel set; and a plurality of first support columns erected for supporting the first panel set and the second panel set,
the house portion being provided with a first house set disposed below the first panel set, a second house set disposed below the second panel set and an intermediate house member disposed between the first house set and the second house set, at least an upper portion of the intermediate house member being formed of a transparent member,
each of the first panel set and the first house set having a connecting portion, one first support column being connected to the connecting portions of the first panel set and the first house set to support the first panel set and the first house set, each of the second panel set and the second house set having another connecting portion, another first support column being connected to the connecting portions of the second panel set and the second house set to support the second panel set and the second house set,
sizes of the first panel set and the second panel set in the second direction, sizes of the first house set, the second house set, and the intermediate house member in the second direction, and supporting positions of the first panel set and the second panel set with respect to the first house set and the second house set by the first support column being set so that the first panel set does not block reception of sunlight by the second panel set and the second panel set does not block reception of sunlight by the first panel set, even when the first panel set and the second panel set are tilted to a maximum to track sunlight,
the first panel set not blocking the reception of sunlight by the second panel set and the second panel set not blocking the reception of sunlight by the first panel set by disposing the intermediate house member between the first house set and the second house set adjacent to each other in the second direction, even when a plurality of first house sets and a plurality of second house sets are alternately arranged in the second direction to increase or decrease number of arrangement,
the manufacturing method comprising:
preparing one or more first house sets having a predetermined size, one or more first panel sets having a predetermined size, one or more second house sets having a predetermined size, one or more second panel sets having a predetermined size, and the plurality of first support columns having a predetermined size;
preparing one or more intermediate house members having a predetermined size;
contact-arranging the first house set, the second house set, and the intermediate house member so that the intermediate house member is positioned between the first house set and the second house set in the second direction;
contact-arranging the intermediate house member and another second house set or another first house set in the second direction by a necessary number with respect to the arranged first house set or the arranged second house set; and
supporting the first panel set and the second panel set with respect to the first house set and the second house set with the first support column.

2. The manufacturing method according to claim 1, wherein the sizes of the first panel set and the second panel set in the second direction, the sizes of the first house set, the second house set, and the intermediate house member in the second direction, and the supporting positions of the first panel set and the second panel set by the first support column are set so that the first panel set blocks the reception of sunlight by the second panel set or the second panel set blocks the reception of sunlight by the first panel set, if the first panel set and the second panel set are tilted more than the maximum to track sunlight.

* * * * *